(12) United States Patent
Rohrbach et al.

(10) Patent No.: US 6,299,477 B1
(45) Date of Patent: Oct. 9, 2001

(54) SELF-CENTERING POWER ADAPTER

(75) Inventors: Matthew Dean Rohrbach, San Francisco; Christopher J. Stringer, Pacifica; Jonathan P. Ive, San Francisco, all of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/368,832

(22) Filed: Aug. 5, 1999

(51) Int. Cl.[7] .............................. H01R 13/72; H01R 13/44
(52) U.S. Cl. .......................... 439/501; 439/956; 439/146
(58) Field of Search .............................. 439/501, 4, 956, 439/146; 191/12.4

(56) References Cited

U.S. PATENT DOCUMENTS

| | | | |
|---|---|---|---|
| 4,282,954 | * 8/1981 | Hill | 191/12.4 |
| 5,103,977 | * 4/1992 | Douglas | 206/702 |
| 5,481,607 | * 1/1996 | Hsiao | 379/438 |
| 5,641,067 | * 6/1997 | Ellis | 206/409 |
| 5,700,150 | * 12/1997 | Morin | 439/4 |
| 5,733,141 | * 3/1998 | Penrod | 439/501 |

* cited by examiner

*Primary Examiner*—Paula Bradley
*Assistant Examiner*—Edwin A. León

(57) ABSTRACT

A Yo-Yo shaped power adapter is provided to better organize and manage its power cable. Its physical configuration further protects the power cable from damage. It is both convenient to use and aesthetically pleasing in appearance. In operation, the combination of the power adapter housing and the AC power cable connector is self-stabilizing in that it maintains its position and orientation by centering itself in response to the many undesirable push and pull forces exerted by the cables near by.

6 Claims, 4 Drawing Sheets

SELF-CENTERING POWER ADAPTER

FIELD OF THE INVENTION

The present invention relates to a power adapter that is physically configured for ease of use and transport. In addition and more in particular, this invention relates to an AC power adapter for a portable electronic device providing damage protection and space savings for the adapter's DC power cable.

BACKGROUND AND SUMMARY OF THE INVENTION

Power adapters are needed because numerous electrical and electronic equipment that are in existence today can not operate with the AC line voltages (e.g., 120V and 240V) received directly from wall outlets. Some of the equipment require electrical power at a different AC voltage level, and some others require power input at various DC voltages. For example, modern personal computers (PCs) require DC voltages for their internal digital operations. In practice, desktop PCs typically incorporate their power adapter circuitry inside their computer housings whereas portable computers, in order to save space and to reduce weight, usually have stand alone power adapter pacts configured separate from the main computer housings. As a result, one end of such power adapter pact connects to and receives from AC line voltage, and the other end connects and supplies to the portable computer a designated DC voltage output. Given the space saving and weight reduction advantages, this arrangement is applicable especially to electrical or electronic portable devices.

Although such power adapter pact has been well known in the art, there are definite disadvantages. A typical power adapter pact tends to be bulky in size and unappealing in appearance. The AC cable of the power adapter pact and the DC cable of the adapter pact are easily entangled with each other and with other power cables while in use. Also in use, there is no means provided to organize and manage the cable assembly. As a result, other power cables close by can easily push and pull the power adapter pact housing into numerous undesirable orientations and configurations. For example, a possible resulting configuration includes the power adapter pact dangling in the air inches off the floor that may physically damage the cables. The adapter pact may also be caused to lean against its and other cable plugs that are inserted in the wall receptacles that as a whole may inadvertently disconnect equipment in use. Further, the adapter pact may end up lying on the ON/OFF switch of a power extension strip that could result in surprising and undesirable consequences. In addition, such a power adapter pact is difficult to carry during transport, and the difficulty is accentuated especially when the pact is dedicated to a portable electronic device.

Therefore, it is an object of the present invention to provide a power adapter capable of organizing and managing its cable both during use and transport. Another object of the present invention is to provide a power adapter capable of protecting its cable from damage while in use. Yet another object of the present invention is to provide a power adapter capable of maintaining its position and orientation while in contact with the many push and pull forces exerted by the power cables near by. One additional object is to provide an appealing power adapter pact so that the users are more inclined to display it than to hide it.

In accordance with the foregoing and other objects, a power adapter is provided to include an AC power cable, a DC power cable, an Yo-Yo shaped adapter housing and electronics residing inside the Yo-Yo shaped adapter housing for adapting an AC line voltage to a desired voltage level. One end of the AC power cable is a typical AC power plug for insertion into a wall outlet. The other end of the AC power cable has an AC power cable connector. The AC power cable connector has a flat circular body and an extension body. The extension body extends normally from the central portion of a circular surface of the flat circular body.

Two circular body halves fastened together form the Yo-Yo shaped adapter housing having a spool and an annular groove. An AC power cable connector recess is further located on the central portion of the outer surface of one of the circular body halves for receiving the extension body of the AC power cable connector. In operation, the Yo-Yo shaped adapter housing would sit on the flat circular body of the AC power cable connector providing a self-centering ability. The electronics resides inside the spool of the adapter housing receives AC power via the AC power cable connector for adapting the line voltage into the desired DC voltage and power level. The electronics is further connected to the DC power cable for DC output via an opening through the spool. The DC power cable could be wound around the spool inside the annular groove of the Yo-Yo shaped adapter housing during use or transport. The other end of the DC power cable has a DC connector configured for connection with and supplying DC power to an electronic device. Also, the side of the DC connector may include a flange appropriately configured to snap into the annular groove for ease of transport.

The present invention is capable of organizing and managing its cable both during use and transport. It protects its cable from damage. It has the self-centering ability to maintain its position and orientation while in contact with the many push and pull forces exerted by the power cables near by. Also, it is aesthetically appealing, and the users are more inclined to display it than to hide it.

BRIEF DESCRIPTION OF THE DRAWINGS

The above advantages of our invention will no doubt become apparent upon a reading of the following descriptions and a study of the following figures of the drawing.

DETAILED DESCRIPTION

With today's advances in technology, the AC to DC power adapter designs generally do not require the rendering of fully detailed schematic diagrams. The definition of electronic functionality of adapting an AC line voltage into a desired DC voltage and power level allows those skilled artisans to generate the desired power adapter implementations that are well known in the art. Those of ordinary skill in the art, once given the voltage and power specifications to be carried out by the present invention will be able to implement the necessary electrical and mechanical arrangements in suitable technologies without undue experimentation. Therefore, for clarification purposes, a detailed description for the AC to DC regulation electronics is not provided herein.

Figure 1:
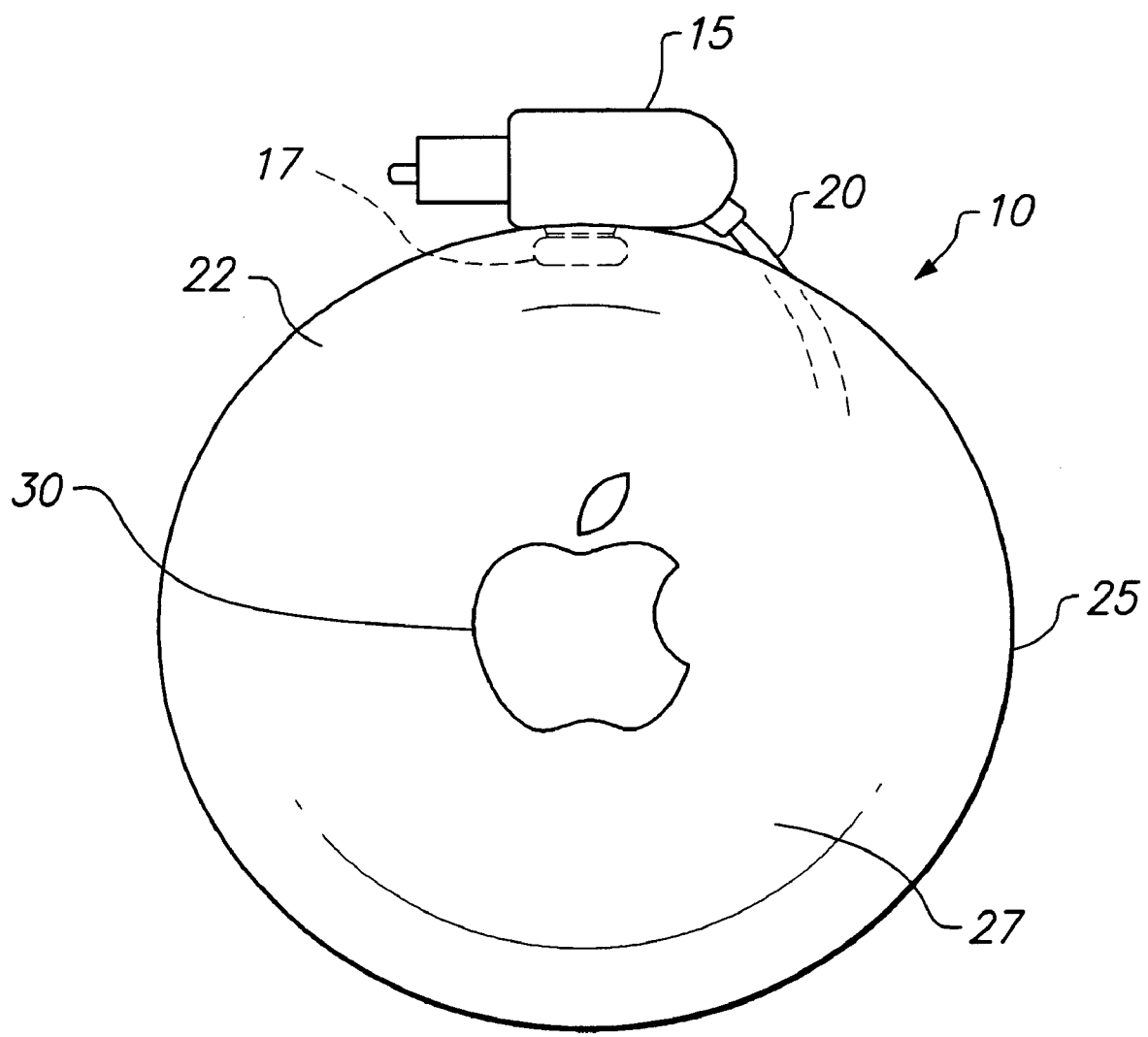
FIG. 1 is a top plan view of a preferred embodiment showing a DC connector of a DC power cable snapped on to an Yo-Yo shaped adapter housing of the present invention.

Referring now to FIG. 1, it is a top plan view of a power adapter 10 showing a DC connector 15 of a DC power cable 20. The DC connector 15 has a flange 17 to its side configured to snap into the inside surfaces of two rims 22 (only one rim is shown) of an Yo-Yo shaped adapter housing 25 of the power adapter 10. FIG. 1 shows an outer surface 27 of the adapter housing 25. Preferably, the Yo-Yo shaped adapter housing 25 is made of hardened and light-weight plastics or acrylics. Further, the central portion of the outer surface 27 is preferred to be manufactured in a manner unable to be seen through. However, the rim 22 that is integral to the outer surface 27 is preferred to be made either clear or translucent. The Apple Computer logo 30 is shown to demonstrate the possibility of the placement of a product logo on the outer surface 27. It 30 is shown for illustrative purposes only and not as a part of the present invention.

Figure 2:
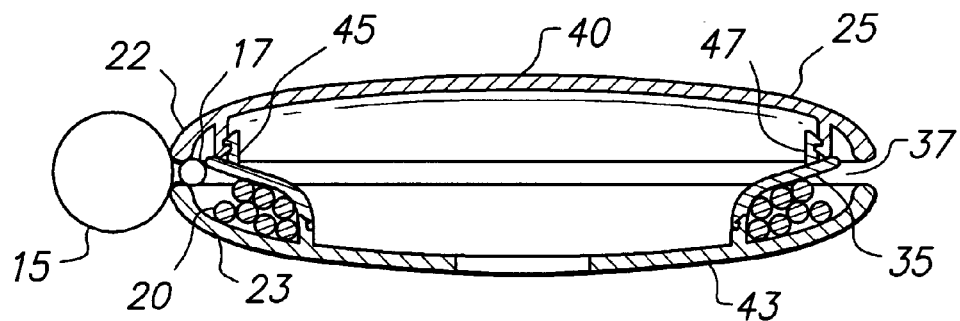
FIG. 2 is a simplified and side view of the present invention showing how the DC power cable is wound around a spool inside an annular groove of the Yo-Yo shaped adapter housing.

FIG. 2 is a simplified and side view of the Yo-Yo shaped adapter housing 25 showing how the DC power cable 20 is wound and placed around a spool 35 inside an annular groove 37 of the adapter housing 25. The DC connector 15 is drawn in a simplified manner to better illustrate how its flange 17 snaps into the annular groove 37 between the two rims 22 and 23. The flange 17 is made of plastics with a certain amount of resilience for the ease of engaging with the rims 22,23. FIG. 2 is further simplified in that it shows neither the AC to DC regulation electronics nor the mechanical configuration inside the spool 35. As mentioned earlier, the electronics for the present invention is well known in the art. However, FIG. 2 does show one way to mechanically fasten the two circular body halves 40,43 together using snaps 45, 47. It is further preferred that the spacing formed by the two rims 22,23 is to have a width slightly smaller than the diameter of the DC power cable 20. Such preference would allow the DC power cable 20 to be kept inside the annular groove 37 once wound. As a result, only the necessary length of the DC power cable 20 is unwound for use since in this case, a minor force would be required to unwind the DC power cable 20 from the spool 35.

Figure 3:
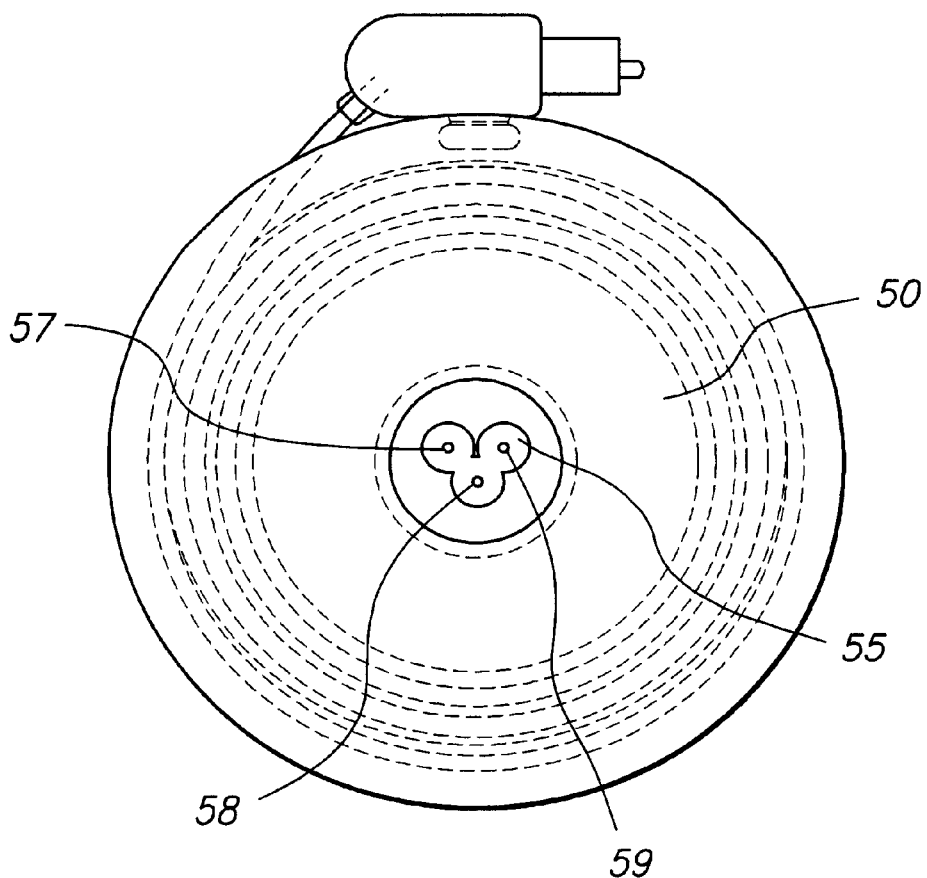
FIG. 3 is a bottom plan view of a preferred embodiment of the present invention illustrating an AC power cable connector recess located in the central portion of the bottom surface of the Yo-Yo shaped adapter housing.

FIG. 3 illustrates an outer surface 50 of the bottom circular body half 43 of the Yo-Yo shaped adapter housing 25. An AC power cable connector recess 55 is located in the central portion of the bottom circular body half 43 accessible from the outer surface 50. The shape of the connector recess 55 is preferred to match that of a connector to be operatively coupled therewith. Pins 57,58,59 are disposed in the connector recess 55 for receiving the connector whereby establishing electrical connection with an AC power source. The pins 57,58,59 are further operatively connected to the AC to DC electronics (not shown) inside the spool 35 for generating a desired DC voltage and power level as output to the DC power cable 20 via an opening through the spool 35 (not shown).

Figure 4A:
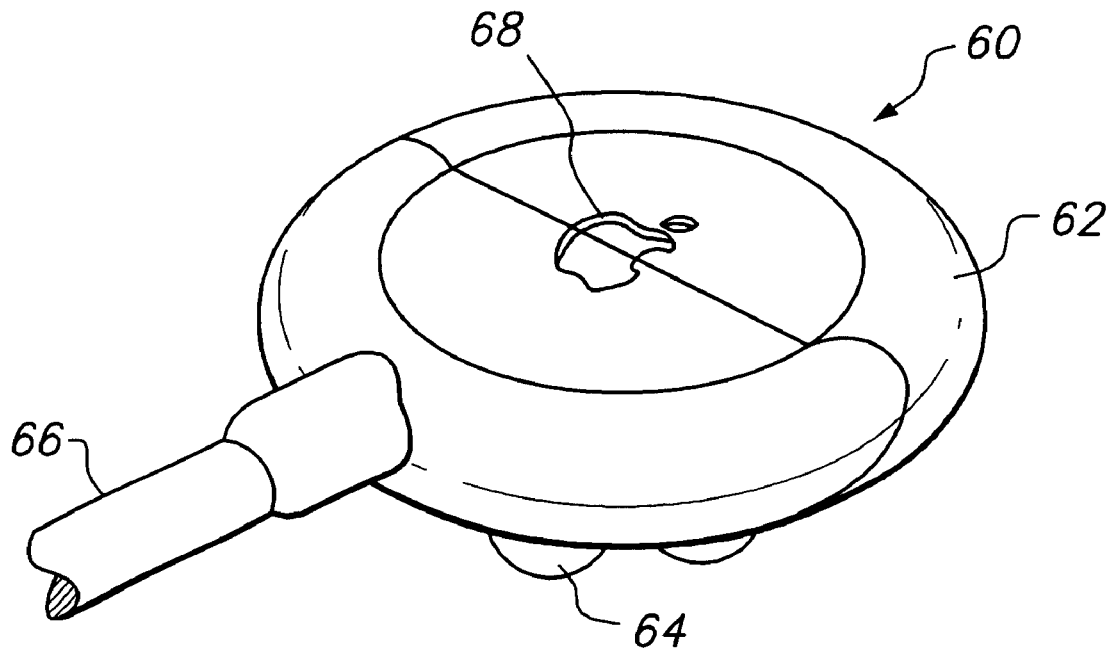
FIG. 4A is a perspective view of an AC power cable connector according to the present invention.
Figure 4B:
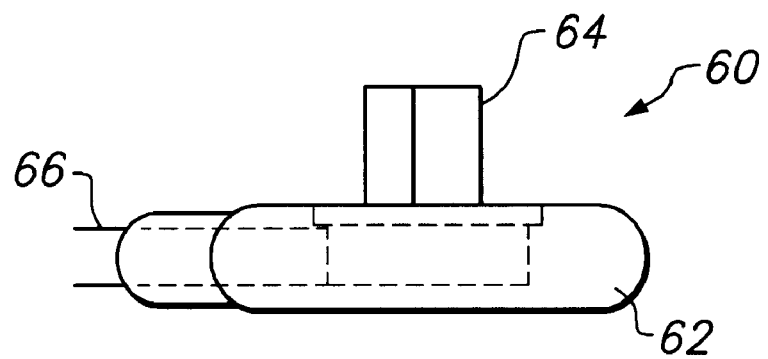
FIG. 4B is a simplified and side view of the AC power cable connector in accordance with the present invention illustrating its flat circular body and its extension body where the extension body extends normally from the central portion of a circular surface of the flat circular body.
Figure 5:
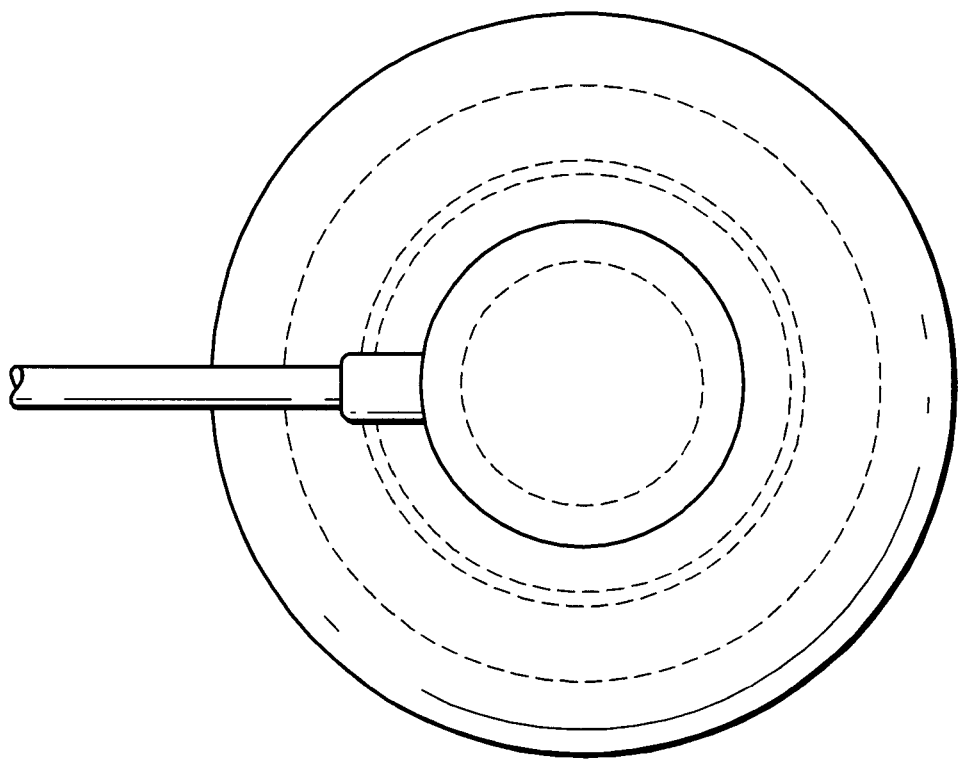
FIG. 5 is a simplified and bottom view of a preferred embodiment of the present invention wherein the AC power cable connector is electrically coupled to the Yo-Yo shaped adapter housing.
Figure 6:
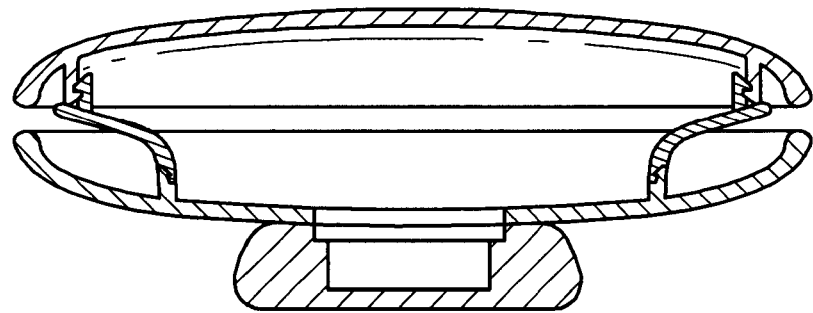
FIG. 6 is a simplified and side view of the preferred embodiment of the present invention illustrated in FIG. 5.

In conjunction with FIG. 3, FIG. 4A and FIG. 4B show in a simplified manner an AC power cable connector 60 in accordance with the present invention. The AC power cable connector 60 has a generally flat circular body 62 and an extension body 64 that extends normally from the central region of the flat circular body 62. The AC power cable connector 60 is electrically connected to a typical AC power plug (not shown) via a power cable 66. The extension body 64 has a shape matching that of the AC power cable connector recess 55. It 64 further contains holes with typical metal sleeves inside for operative engagement with the pins 57,58,59 inside the connector recess 55. The metal sleeves are electrically connected to the AC power plug for delivering AC power to the electronics residing inside the spool 35. The height of the extension body 64 is preferred to be the same as or slightly longer than the depth of connector recess 55 for stability purposes. Again, the Apple Computer logo 68 is shown merely to demonstrate the possibility of the placement of a product logo on the flat circular body 62, and it is not a part of the present invention. The physical configuration of the AC power cable connector 60 and the adapter housing 25 enable the numerous advantages of the present invention. As further clarifications, FIG. 5 and FIG. 6 illustrate simplified bottom and side views of the Yo-Yo shaped adapter housing 25 and the AC power cable connector 60 operatively engaged.

In operation, the AC power plug of the AC power cable 66 is inserted into a wall outlet to receive AC line voltage. The AC power is fed to the typical AC to DC regulation electronics residing inside the spool 35 via the AC power cable connector 60 and pins 57,58,59. The regulated DC voltage output is delivered to the DC power cable 20. Subsequently, the DC voltage is supplied to an electronic device (not shown) via the DC power connector 15. As to materials, the cables and connectors may be encapsulated with plastics, may be translucent, may be resilient, and may be either or both. Regardless, in operation or in transport, the present invention is capable of organizing and managing its DC power cable 20. The annular groove 37 keeps it from dangling and protects it from damage by winding to the spool 35 the unnecessary length of the DC power cable 20. Further, the Yo-Yo shaped adapter housing 25 and AC power cable connector 60 combination provides a self-centering ability to maintain its position and orientation even while in contact with other push and pull forces exerted by the cables near by. Not to be ignored, it is also aesthetically appealing both in use and in transport whereby motivating users to display it than to hide it.

While the present invention has been described in terms of a preferred embodiment, it is contemplated that persons reading the foregoing detailed description and studying the drawing will realize various alterations and modifications for this invention. It is therefore intended that the following appended claims be interpreted as including all such alterations and modifications as fall within the true spirit and scope of the present invention.

What is claimed is:

1. A power adapter comprising:
   a Yo-Yo shaped power adapter housing formed by fastening a top circular body half to a bottom circular body half, said top circular body half having a top outer surface and top mechanical means on the other side of the top outer surface and said bottom circular body half having a bottom outer surface and bottom mechanical means on the other side of the bottom outer surface and further having a connector recess centrally located and accessible from the bottom outer surface, said top and bottom mechanical fastening means fastened the two circular body halves together and further forming a spool and an annular groove;

a DC power cable including a DC connector having a flange appropriately configured to snap into the annular groove for coupling to an electronic device for supplying DC power, said DC power cable extending outward into the annular groove through an opening in the spool of the power adapter housing;

electronics means for adapting AC line power to a predetermined DC voltage level, said electronics means residing inside the spool, said electronics means including a plurality of pins extruding into the connector recess;

an AC power cable having an AC power plug for receiving AC power from a wall outlet and having an AC power cable connector, said power cable connector having a generally flat circular body and an extension body, said extension body extending normally from the central portion of the flat circular body so that the generally flat circular body being positioned outside of the power adapter housing, said extension body being further configured to removably engage the connector recess and the plurality of pins for supplying the AC power to the electronics means; and said Yo-Yo shaped power adapter housing and said AC power cable connector forming a combination whereby increasing stability allowing maintenance of position and orientation in response to outside forces.

2. The power adapter as claimed in claim 1 wherein said annular groove has an opening, the width of said opening being slightly shorter than the diameter of the DC power cable.

3. The power adapter as claimed in claim 1 wherein the height of said extension body is slightly longer than the depth of said connector recess.

4. A power adapter housing comprising:

a Yo-Yo shaped power adapter housing formed by fastening a top circular body half to a bottom circular body half, said top circular body half having a top outer surface and top mechanical means on the other side of the top outer surface and said bottom circular body half having a bottom outer surface and bottom mechanical means on the other side of the bottom outer surface and further having a connector recess centrally located and accessible from the bottom outer surface, said top and bottom mechanical fastening means fastened the two circular body halves together and further forming a spool and an annular groove;

a first power cable including a first power cable connector having a flange appropriately configured to snap into the annular groove, said first power cable extending outward into the annular groove through an opening in the spool of the power adapter housing;

a second power cable having a second power cable connector, said second power cable connector having a generally flat circular body and an extension body, said extension body extending normally from the central portion of the flat circular body so that the generally flat circular body being positioned outside of the power adapter housing, said extension body being further configured to removably engage the connector recess;

said Yo-Yo shaped power adapter housing and said second power cable connector forming a combination whereby increasing stability allowing maintenance of position and orientation in response to outside forces.

5. The power adapter as claimed in claim 4 wherein said annular groove has an opening, the width of said opening being slightly shorter than the diameter of the first power cable.

6. The power adapter as claimed in claim 4 wherein the height of said extension body is slightly longer than the depth of said connector recess.

* * * * *